US012671039B2

(12) United States Patent
Tan et al.

(10) Patent No.: US 12,671,039 B2
(45) Date of Patent: Jun. 30, 2026

(54) METHOD OF MANUFACTURING THIN FILM DEVICES

(71) Applicant: Solaires Entreprises Inc., Victoria (CA)

(72) Inventors: Furui Tan, Kaifeng Henan (CN); Chen Dong, Kaifeng Henan (CN); Wanlong Wang, Kaifeng Henan (CN); Yuhao Song, Kaifeng Henan (CN); Mahshid Sam, Victoria (CA)

( * ) Notice: Subject to any disclaimer, the term of this patent is extended or adjusted under 35 U.S.C. 154(b) by 553 days.

(21) Appl. No.: 18/297,298

(22) Filed: Apr. 7, 2023

(65) Prior Publication Data

US 2023/0395327 A1 Dec. 7, 2023

(30) Foreign Application Priority Data

Jun. 6, 2022 (CN) .......................... 202210628377.6

(51) Int. Cl.
*H01G 9/00* (2006.01)
*H01G 9/20* (2006.01)

(52) U.S. Cl.
CPC ......... *H01G 9/0036* (2013.01); *H01G 9/2009* (2013.01)

(58) Field of Classification Search
CPC .. H01G 9/0036; H01G 9/2009; H10K 50/844; H10K 59/873; H10K 71/00;
(Continued)

(56) References Cited

U.S. PATENT DOCUMENTS 4,731,335 A * 3/1988 Brigati ................... G01N 1/312
118/421
11,177,439 B2 * 11/2021 Bailie .................... H10K 71/40
(Continued)

FOREIGN PATENT DOCUMENTS

| CN | 105024015 A | * 11/2015 | ............. H10K 30/81 |
| CN | 113345825 A | * 9/2021 | ....... H01L 21/67733 |
| CN | 114864859 A | * 8/2022 | ........... H01M 4/622 |

OTHER PUBLICATIONS

Kim et al., "Effects of temperature and coating speed on the morphology of solution-sheared halide perovskite thin-films", J. Mater. Chem. A, 2018, 6, 24911-24919.
(Continued)

*Primary Examiner* — Scott B Geyer
(74) *Attorney, Agent, or Firm* — Baumgartner Patent Law, LLC; Marc Baumgartner

(57) ABSTRACT

A method of concomitantly manufacturing at least two thin-film devices is provided, the method comprising: applying a solution on a first surface of a first planar substrate; positioning a second surface of a second planar substrate proximate to the first surface of the first planar substrate to provide parallelly disposed adjacent substrates, such that the first surface and the second surface are in contact with the solution; sliding the parallelly disposed adjacent substrates over one another such that the solution is drawn over the first surface and the second surface, which when the parallelly disposed adjacent substrates slide passed one another, provide a first coating on a first surface and a second coating on the second surface; and drying the first coating and the second coating, thereby concomitantly manufacturing at least two thin-film devices.

18 Claims, 6 Drawing Sheets

(58) Field of Classification Search
CPC ........ H10K 71/40; H10K 71/12; H10K 30/40;
H10K 30/00; H10K 30/15; H10K 30/151
See application file for complete search history.

(56) References Cited

U.S. PATENT DOCUMENTS

| 11,665,917 | B2 * | 5/2023 | Park | H10K 30/82 |
| | | | | 136/263 |
| 2019/0221755 | A1 * | 7/2019 | Yu | H10K 10/484 |
| 2023/0005992 | A1 * | 1/2023 | Hermenau | H10K 39/12 |
| 2024/0138248 | A1 * | 4/2024 | Vak | H10K 30/81 |

OTHER PUBLICATIONS

Choe et al., "Rapid large-grain (> 100 μm) formation of organic-inorganic perovskite thin films via shear deposition for photovoltaic application", Solar Energy, 191 (2019) 629-636.
Adugna et al., "Toward Large-Area and Fully Solution-Sheared Perovskite Solar Cells", ACS Appl. Mater. Interfaces 2021, 13, 25926-25936.
Adugna et al., "Toward Large-Area and Fully Solution-Sheared Perovskite Solar Cells", Supporting Information, S1-S13, 2021.

* cited by examiner

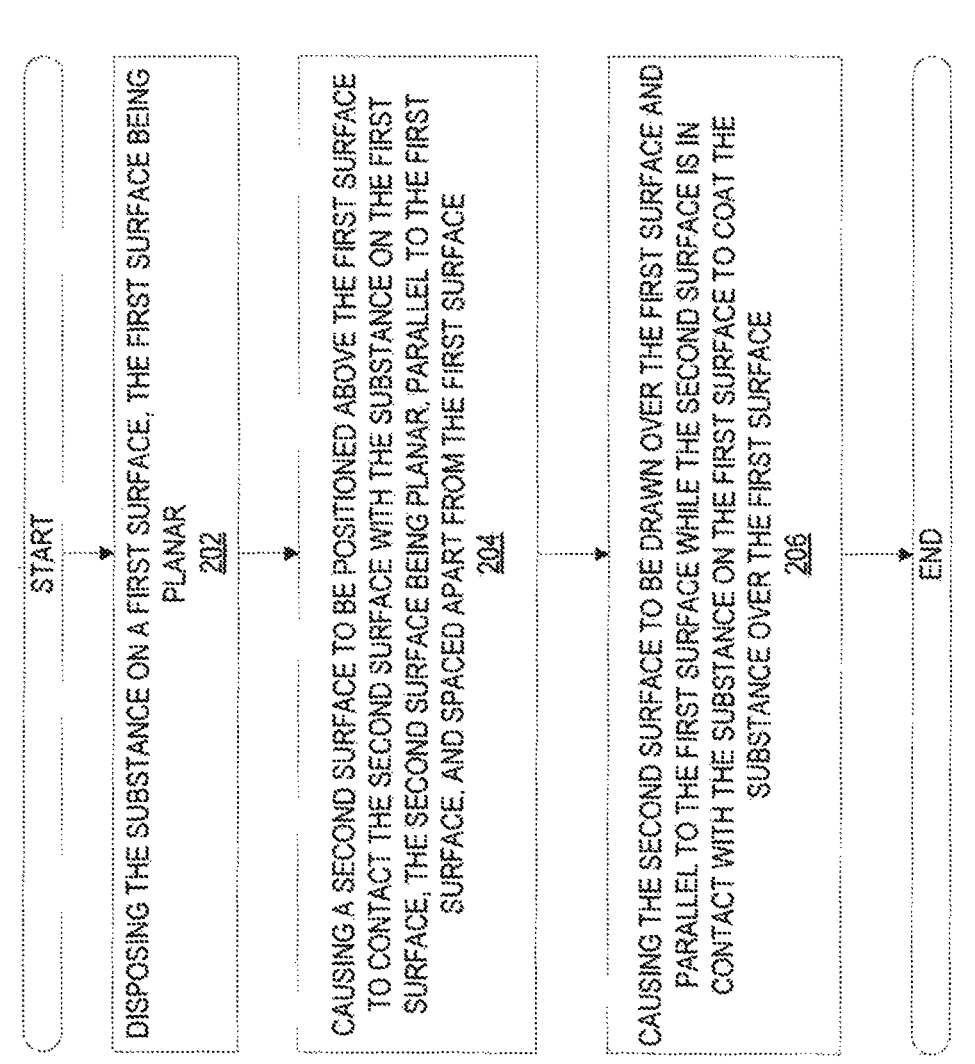

200

START

DISPOSING THE SUBSTANCE ON A FIRST SURFACE, THE FIRST SURFACE BEING PLANAR
202

CAUSING A SECOND SURFACE TO BE POSITIONED ABOVE THE FIRST SURFACE TO CONTACT THE SECOND SURFACE WITH THE SUBSTANCE ON THE FIRST SURFACE, THE SECOND SURFACE BEING PLANAR, PARALLEL TO THE FIRST SURFACE, AND SPACED APART FROM THE FIRST SURFACE
204

CAUSING THE SECOND SURFACE TO BE DRAWN OVER THE FIRST SURFACE AND PARALLEL TO THE FIRST SURFACE WHILE THE SECOND SURFACE IS IN CONTACT WITH THE SUBSTANCE ON THE FIRST SURFACE TO COAT THE SUBSTANCE OVER THE FIRST SURFACE
206

END

FIG. 2

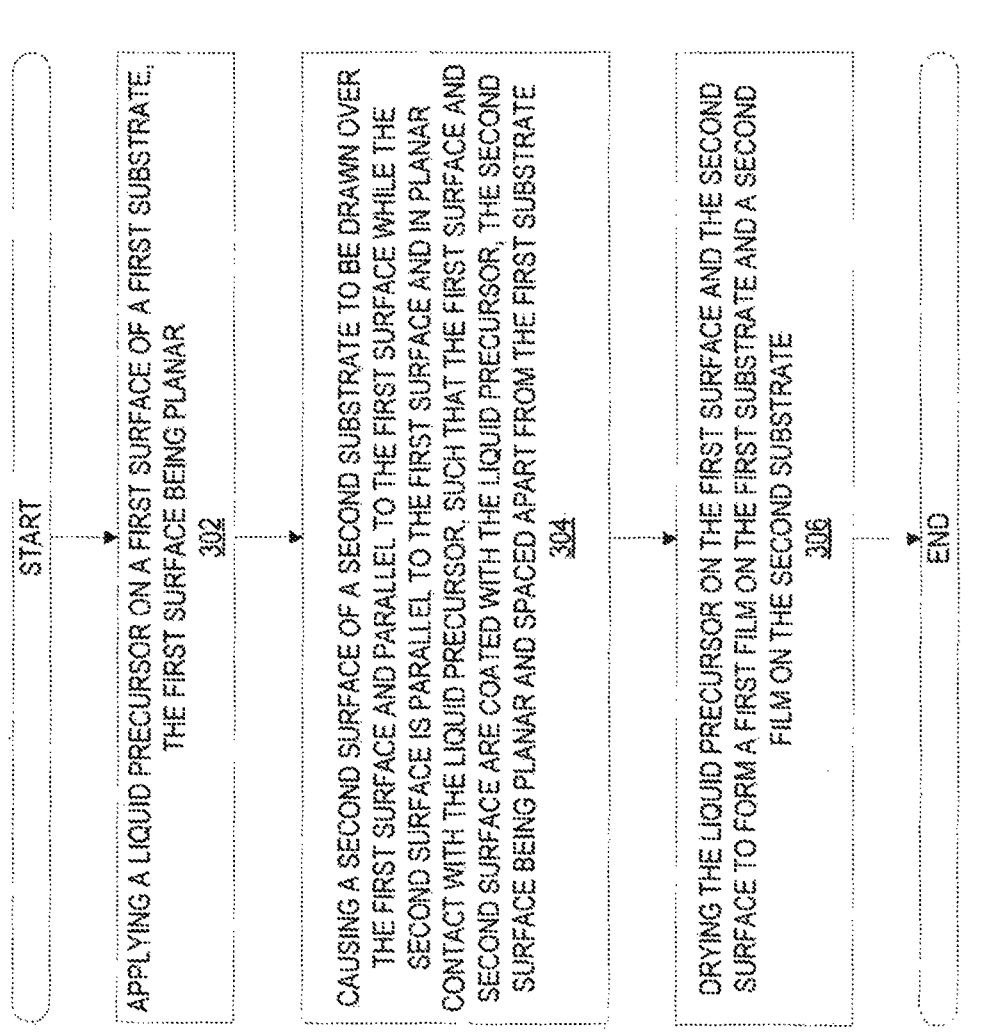

300

START

APPLYING A LIQUID PRECURSOR ON A FIRST SURFACE OF A FIRST SUBSTRATE, THE FIRST SURFACE BEING PLANAR
302

CAUSING A SECOND SURFACE OF A SECOND SUBSTRATE TO BE DRAWN OVER THE FIRST SURFACE AND PARALLEL TO THE FIRST SURFACE WHILE THE SECOND SURFACE IS PARALLEL TO THE FIRST SURFACE AND IN PLANAR CONTACT WITH THE LIQUID PRECURSOR, SUCH THAT THE FIRST SURFACE AND SECOND SURFACE ARE COATED WITH THE LIQUID PRECURSOR, THE SECOND SURFACE BEING PLANAR AND SPACED APART FROM THE FIRST SUBSTRATE
304

DRYING THE LIQUID PRECURSOR ON THE FIRST SURFACE AND THE SECOND SURFACE TO FORM A FIRST FILM ON THE FIRST SUBSTRATE AND A SECOND FILM ON THE SECOND SUBSTRATE
306

END

FIG. 3

METHOD OF MANUFACTURING THIN FILM DEVICES

CROSS REFERENCE TO RELATED APPLICATIONS

This application claims priority to Chinese Patent Application Serial No. 2022106283776, filed Jun. 6, 2022, entitled "METHOD OF MANUFACTURING PHOTO-VOLTAIC DEVICES". The above-identified priority patent application is incorporated herein by reference in their entirety.

FIELD

The present technology relates to methods of manufacturing thin film devices. More specifically it relates to methods of manufacturing photovoltaic devices.

BACKGROUND

Thin-film solar (photovoltaic) cells, and particularly perovskite devices, are a promising technology for sustainable and renewable energy generation since they can be flexibly installed in a variety of settings and can be much less expensive to manufacture than other types of solar cells.

Metal halide perovskite photovoltaics have undergone rapid development in the past few years, with lab efficiency of small area devices reaching 25%, which is competitive with silicon solar cells. At the same time, the pursuit of large area perovskite solar cells has attracted increasing attention in recent years. For the fabrication of large area perovskite films, industrial processes such as slot-die coating, blade coating, and roll-to-roll fabrication, may be adopted. In such processes, precise adjustments and modulation of several parameters are usually required to obtain a film with sufficiently high quality for photovoltaic applications. The dynamic coating process in these methods may require tight tolerances on the machinery involved in manufacturing. Such methods commonly fabricate a single film during each round of coating.

Thin-film devices are formed using several materials layered upon one another, by printing, coating using polymer inks, or via vacuum deposition on a substrate. A substrate in a thin-film device may include polyethylene terephthalate (PET) and indium tin oxide (ITO) as initial layers.

The relatively poor manufacturability of perovskite solar cells, when utilizing using current processes, is a significant obstacle preventing broader adoption of these cells. For example, making such processes more scalable and reproducible may improve commercial viability of perovskite solar cells.

An existing process that has been proposed is called "solution shearing" as described in Min Kyu Kim, et al. J. Mater. Chem. A, 2018, 6, 24911; Jihye Choe, et al. Solar Energy, 2019, 191, 629; Gizachew Belay Adugna, et al. ACS Appl. Mater. Interfaces, 2021, 13, 25926. In this process, a tilted blade is used to scrape liquid on a substrate.

In a related technique, blade coating relies on a sharp edge that remains in contact with the liquid solution being used to form a coating. The sharp edge may be substantially one-dimensional or at least not extending completely along the plane that is either forming the coating or is having the coating formed thereon.

The blade coating process requires precise adjustment of the distance between the blade and the surface on which the coating is being formed.

Methods like blade coating, screen printing and roll-to-roll coating are limited to producing one perovskite film in a round of coating.

What is needed is an efficient method of producing thin film devices. It would be preferable if two or more coated surfaces could be produced at one time. It would be preferable if the depth of the coatings could be controlled. It would be further preferable if a second and subsequent coating could be applied.

SUMMARY

The present technology provides an efficient method of producing thin film devices. Two or more coated surfaces can be produced at one time. The depth of the coatings can be controlled. A second and subsequent coating can be applied.

In one embodiment, a method of concomitantly manufacturing at least two thin-film devices is provided, the method comprising:

applying a solution on a first surface of a first planar substrate; positioning a second surface of a second planar substrate proximate to the first surface of the first planar substrate to provide parallelly disposed adjacent substrates, such that the first surface and the second surface are in contact with the solution;

sliding the parallelly disposed adjacent substrates over one another such that the solution is drawn over the first surface and the second surface, which when the parallelly disposed adjacent substrates slide passed one another, provide a first coating on a first surface and a second coating on the second surface; and drying the first coating and the second coating, thereby concomitantly manufacturing at least two thin-film devices.

In the method, the second substrate may be spaced apart from the first substrate to define a gap between the second surface and the first surface, the method further comprising:

after positioning the second surface of the second planar substrate proximate to the first surface, displacing the second surface towards the first surface to urge the liquid within the gap to fill the gap, such that the solution is spread over the first surface and the second surface to establish planar contact of the solution with the first surface and the second surface.

The method may further comprise heating at least one of the at least two thin-film devices after drying the first coating and the second coating.

In the method, the second surface of the second substrate may be slid over the first surface of the first substrate, which is static.

In the method, the first surface of the first substrate may be slid over the second surface of the second substrate, which is static.

In the method, both the first surface of the first substrate and the second surface of the second substrate may be slid over one another.

In the method, the heating may be at between 50° C. and 300° C.

In the method, the heating may be at 100° C.

In the method, the solution may be a liquid precursor.

In the method, the liquid precursor may be a perovskite precursor.

The method may further comprise applying a second solution to the first coating after drying the first coating and the second coating, positioning the second surface of the second planar substrate proximate to the first surface of the first planar substrate to provide parallelly disposed adjacent substrates, such that the first coating and the second coating are in contact with the second solution;

sliding the parallelly disposed adjacent substrates over one another such that the solution is drawn over the first coating and the second coating, which when the parallelly disposed adjacent substrates slide passed one another, provide a third coating on a first coating and a fourth coating on the second coating; and drying the third coating and the fourth coating, thereby manufacturing at least two thin-film devices.

The method may further comprise applying a second solution to the first coating after drying the first coating and the second coating, positioning the second surface of the second planar substrate proximate to the first surface of the first planar substrate to provide parallelly disposed adjacent substrates, such that the first coating and the second coating are in contact with the second solution;

sliding the parallelly disposed adjacent substrates over one another such that the solution is drawn over the first coating and the second coating, which when the parallelly disposed adjacent substrates slide passed one another, provide a third coating on a first coating and a fourth coating on the second coating; and drying the third coating and the fourth coating, thereby manufacturing at least two thin-film perovskite devices.

The method may further comprise applying at least one additional solution after drying the third coating and the fourth coating, and repeating the positioning, sliding and drying steps.

The method may further comprise applying the solution on a first surface of the second planar substrate;

positioning a second surface of a third planar substrate proximate to the first surface of the second planar substrate to provide parallelly disposed adjacent substrates, such that the first surface of the second planar substrate and the second surface of the third planar substrate are in contact with the solution;

sliding the parallelly disposed adjacent substrates over one another such that the solution is drawn over the first surface of the second planar substrate and the second surface of the third planar substrate, which when the parallelly disposed adjacent substrates slide passed one another, provide a first coating on the first surface of the second planar substrate and a second coating on the second surface of the third planar substrate; and drying the first coating on the first surface of the second planar substrate and the second coating on the third planar substrate.

In another embodiment a method of concomitantly manufacturing at least two thin-film photovoltaic devices is provided, the method comprising applying a perovskite precursor on a first surface of a first planar substrate;

positioning a second surface of a second planar substrate proximate to the first surface of the first planar substrate to provide parallelly disposed adjacent substrates, such that the first surface and the second surface are in contact with the perovskite precursor;

sliding the parallelly disposed adjacent substrates over one another such that the perovskite precursor is drawn over the first surface and the second surface, which when the parallelly disposed adjacent substrates slide passed one another, provide a first coating on a first surface and a second coating on the second surface;

drying the first coating and the second coating to provide a first film and a second film; and fabricating a charge transport layer on each of the first film and the second film;

fabricating an electrode on the charge transport layers, thereby concomitantly manufacturing at least two thin-film photovoltaic devices.

In the method, the perovskite precursor may be an organic-inorganic halide perovskite precursor.

The face-to-face planar contact drawing (PCD) process of the present technology provides concomitant fabrication of two uniform and smooth perovskite films in a single round of coating. The perovskite ink may be sandwiched uniformly between two substrates with faces contacting the wet ink. After the two substrates are pulled away in a parallel direction, the wet precursor films on each substrate may be dried using drying techniques including but not limited to hot air blowing, infrared heating, high intensity light exposure or vacuum processing. The two same perovskite films may be obtained after annealing at 100° C. in air.

In some cases, the PCD process may use less material compared to blade coating. All of the applied precursor solution can spread and be dried on surface to form the perovskite film with a certain thickness.

In some cases, the PCD process can be used to fabricate thin film solar cells, including to use PCD method to prepare a charge transport layer on the as-obtained perovskite layer and thereafter to use PCD method to prepare an electrode layer on the charge transport layer.

In some cases, PCD may allow fabrication of perovskite films, and non-perovskite films such as metal oxides, organic semiconducting layers, inorganic salts and conducting electrodes.

In some cases, PCD may allow improved product yields. For example, product yields may be doubled in one round of coating, which may also save time and reduce energy consumption.

In some cases, PCD may allow larger tolerances on smoothness and flatness of the tabletop holding the substrate. In some cases, a PCD process may be achieved with mechanical arms without a bottom supporting table.

In some cases, PCD may obviate a need to adjust the distance between the two substrates.

In some cases, two perovskite films with different thickness may be obtained at the same time. This may allow for manufacturing for applications such as semitransparent devices and tandem devices, and so on. In some cases, perovskite films of differing thickness may be achieved by varying a speed of the upper substrate relative to the lower substrate (and vice versa), A higher drawing speed may result in lower thickness films. In some cases, the thickness of the perovskite films may be increased by enhancing wettability and/or adhesion between substrate(s) and the liquid precursor using surface treatments such as UV-ozone, plasma cleaning, and chemical treatment. Differing thicknesses of the respective substrates may be achieved by using different surface treatments for different substrates. In some cases, a semitransparent perovskite film may be obtained through a PCD process and then by assembling a transparent top electrode. In some cases, a tandem structured solar cell may be obtained by forming a large bandgap perovskite film (such as 1.7 eV) using a PCD process and then, by adding an intermediate tunnelling layer on this light incident film, another perovskite film with small band gap (such as 1.2 eV) may be obtained again through PCD process.

In one aspect, the disclosure describes a method of manufacturing a thin-film photovoltaic cell, comprising: applying a liquid on a first surface of a first substrate, the first surface being planar; causing a second surface of a second substrate to be slid over the first surface and parallel to the first surface while the second surface is parallel to the first surface and in planar contact with the liquid, such that the liquid is drawn over the first surface and second surface leaving the surfaces coated with the liquid when the substrates separate from one another, the second surface being planar and spaced apart from the first substrate; and drying the liquid on the first surface and the second surface to form a first film on the first substrate and a second film on the second substrate.

In another aspect, the disclosure describes a method of forming a coating of a substance, comprising: disposing the substance on a first surface, the first surface being planar; causing a second surface to be positioned above the first surface to contact the second surface with the substance on the first surface, the second surface being planar, parallel to the first surface, and spaced apart from the first surface; and causing the second surface to be slid over the first surface and parallel to the first surface while the second surface is in contact with the substance on the first surface to coat the substance over the first surface.

In some other aspects, the disclosure describes a method of forming a coating of a substance on more than two surfaces at the same time, comprising: disposing the substance respectively in between the first/second, second/third, third/fourth substrate, causing a second, third, and fourth substrate to be positioned above and contacted with the first, second, and third substrate, respectively; all the four substrates are planar, parallel to each other, and spaced apart from each other by the substance covering over the first surface of the first substrate, the second and first surface of the second and third substrates, and the second surface of the fourth substrate; causing the first, second, third and fourth substrate to be slid over each other while keeping parallel and contact to each other to coat the substance over the first surface of the first substrate, the second and first surface of the second and third substrates, and the second surface of the fourth substrate.

Embodiments can include combinations of the above features.

Further details of these and other aspects of the subject matter of this application will be apparent from the detailed description included below and the drawings.

DESCRIPTION OF THE DRAWINGS

FIG. 2 is a flow chart of a method 200 of forming a coating of a solution, in accordance with an embodiment.

FIG. 3 is a flow chart of a method 300 of manufacturing a thin-film photovoltaic cell.

DESCRIPTION

Figures 1A, 1B, 1C, 1D:
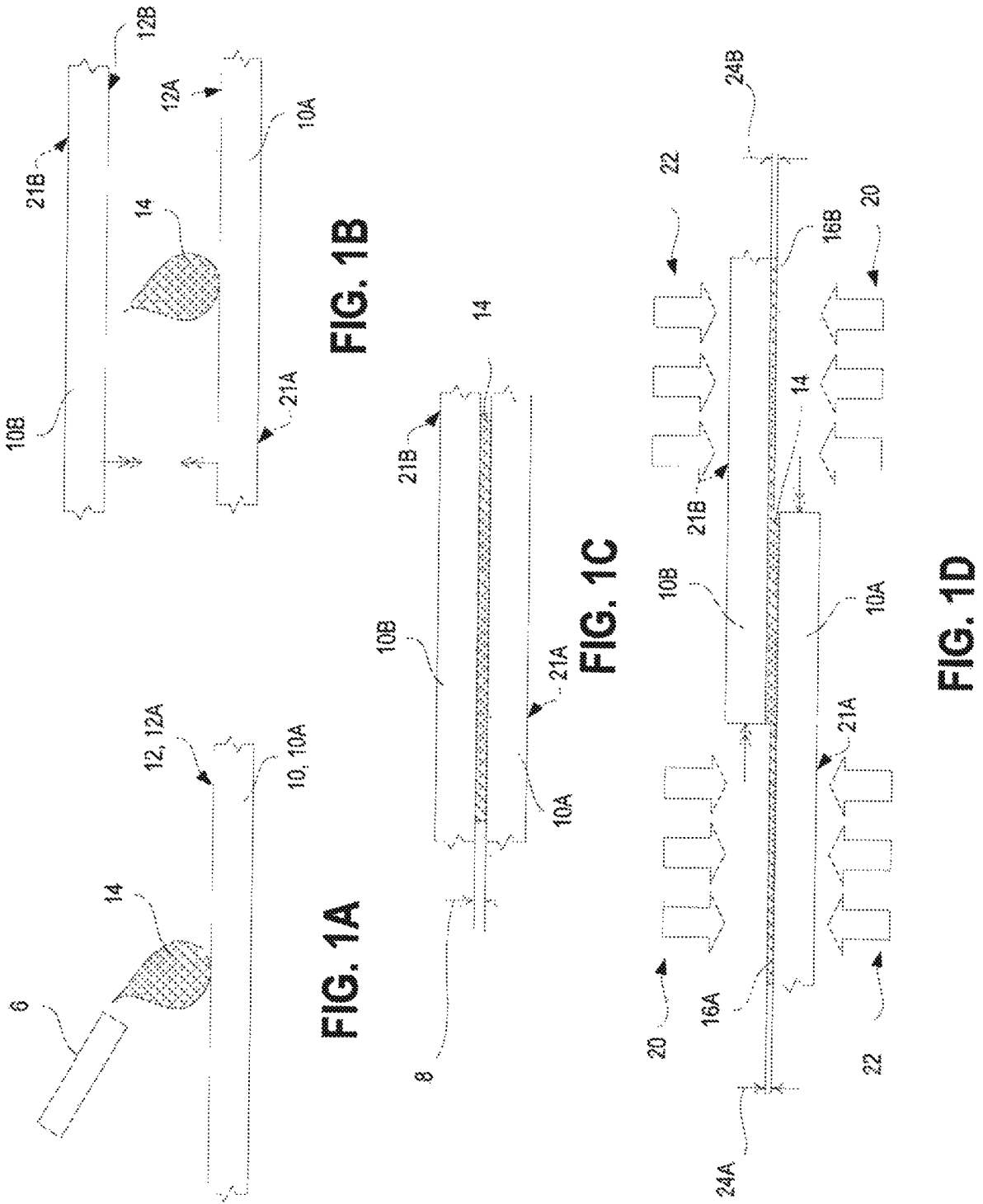
FIG. 1A is a side elevation view of a first substrate with a solution disposed thereon, in accordance with an embodiment.
FIG. 1B is a side elevation view of the first substrate and a second substrate positioned above the first substrate, in accordance with an embodiment.
FIG. 1C is a side elevation view of the first substrate and the second substrate with the solution therebetween, in accordance with an embodiment.
FIG. 1D is a side elevation view of the first substrate and the second substrate being slid parallel to each other to form coatings on each of the first substrate and the second substrate, in accordance with an embodiment.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art.

Although any methods and materials similar or equivalent to those described herein can also be used, the acceptable methods and materials are now described.

The following disclosure relates to methods of forming coatings, and in particularly, forming such coatings in the manufacture of photovoltaic devices. In some embodiments, the methods and processes disclosed herein may improve scalability and/or reproducibility.

Aspects disclosed herein facilitate improved throughput, as two coated substrates (or substrates with a film thereon) may be formed with a single run. In some aspects, each of these two films may be separately tuned for different applications, for example, but not limited to semi-transparent photovoltaics, tandem devices and normal single junction solar cells.

Aspects disclosed herein improve manufacturability, by improving ease of tuning the manufacturing process and reducing costs thereof. In some aspects a uniform thickness of wet film may be formed by ensuring the two substrates contact each other uniformly.

Aspects disclosed herein are not necessarily limited to particular material types (and properties thereof) or a number of layers that may be coated on top of each other using various embodiments of systems and methods. For example, various different layers of solar panels may be coated using aspects disclosed herein.

Aspects of various embodiments are now described in relation to the figures.

Definitions

Moves over—in the context of the present technology, "moves over" or "slides over" does not mean moves above or is slid above but means movement along or across.

This-film device—in the context of the present technology, a thin-film device is a substrate that has at least one thin film thereon.

DETAILED DESCRIPTION

FIGS. 1A-1F depict various stages during a method or process of manufacturing a thin-film photovoltaic cell that involves forming a coating of a solution 14, such as liquid precursor, on a surface 12 (or first surface 12A) of a substrate 10 (or first substrate 10A).

FIG. 1A is a side elevation view of the first substrate 10A with a solution 14 disposed thereon, in accordance with an embodiment.

FIG. 1B is a side elevation view of the first substrate 10A and a second substrate 10B positioned above the first substrate 10A, in accordance with an embodiment.

FIG. 1C is a side elevation view of the first substrate 10A and the second substrate 10B with the solution 14 therebetween, in accordance with an embodiment.

FIG. 1D is a side elevation view of the first substrate 10A and the second substrate 10B being slid parallel to each other until they separate to form a first coating 16A on the first substrate 10A and a second coating 16B on the second substrate 10B, in accordance with an embodiment.

Figures 1E, 1F:
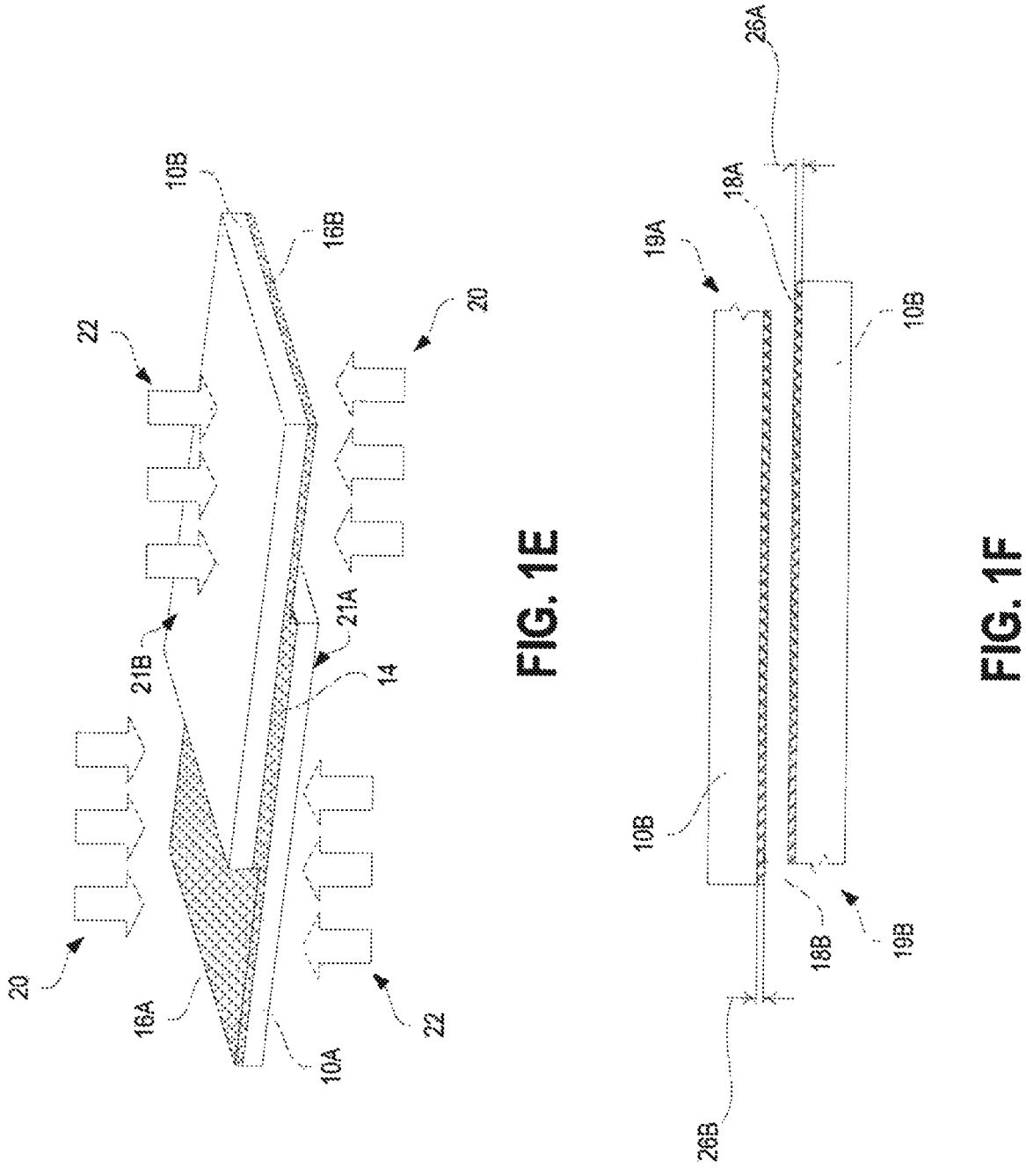
FIG. 1E is a perspective view of the first substrate and the second substrate being slid parallel to each other to form coatings on each of the first substrate and the second substrate, in accordance with an embodiment.
FIG. 1F is a side elevation view of the first substrate and the second substrate after formation of films on the first substrate and second substrate, in accordance with an embodiment.

FIG. 1E is a perspective view of the first substrate 10A and the second substrate 10B being slid parallel to each other to form coatings 16A, 16B on each of the first substrate 10A and the second substrate 10B, in accordance with an embodiment.

FIG. 1F is a side elevation view of the first substrate 10A and the second substrate 10B after formation of a first film 18A on the first substrate 10A and a second film 18B on the second substrate 10B, in accordance with an embodiment.

Referring to FIGS. 1A-1F, the first substrate 10A may define the first surface 12A and the second substrate 10B may define a second surface 12B. The first surface 12A and the second surface 12B may be substantially planar surfaces. For example, the first surface 12A and the second surface 12B may be substantially flat.

In some embodiments, the first surface 12A and/or the second surface 12B may be patterned and/or masked to selectively coat the surface. It is understood that the first surface 12A and the second surface 12B are considered to be planar in the presence of ridges and raised portions due to masking, as long as such ridges and raised portions are smaller than a desired thickness of the coating and film thereon. In some embodiments, masking and patterning may allow multiple cells and devices to be coated on each substrate.

In some cases, the first substrate 10A and the second substrate 10B may include a carrier substrate on which another (temporary) substrate is attached, for example, but not limited to a flexible film. In this case, coatings may be applied on to the temporary substrate, which is then removed at the end of the process.

The surfaces 12A, 12B may be configured to serve as sub-surfaces of a photovoltaic device or plate. The substrates 10A, 10B may configured to serve as substrates of separate photovoltaic devices or the same photovoltaic device.

In various embodiments, the first and second substrates 10A, 10B may be, for example, but not limited to plates of glass, glassy substances, glass-like substances, plastic plates, metal plates, and ceramics plates. The first and second surfaces 12A, 12B may be surfaces of these plates. In various embodiments, the cell or device geometry for each substrate 10A, 10B may be the same or different.

In some embodiments, the first and second substrates 10A, 10B may include indium tin oxide (ITO) and/or tin(IV) oxide ($SnO_2$). For example, in some cases, $SnO_2$ may be layered on top of ITO. Additional layers and/or films may be formed on the first substrate 10A and the second substrate 10B.

In various embodiments, the substrates 10A, 10B may be flexible and/or rigid substrate. The substrates 10A, 10B may be similar or dissimilar in terms of rigidness.

As shown in FIG. 1A, in various embodiments, the solution 14 may be applied using an applicator 6 such as a dropper.

In various embodiments, the solution 14 may be disposed on a first surface 12A of the first substrate 10A as a droplet. In some embodiments, the solution 14 may be spread across the first surface 12A.

In some embodiments, the solution 14 may be a liquid precursor. For example, a liquid precursor may be a chemical precursor and/or may be configured to react with solutions on the first substrate 10A and/or the second substrate 10B to form a desired product compound or structure, and/or undergo heating/drying to form a such a product compound or structure.

In various embodiments, the liquid precursor may include Methylammonium lead halides (MALHs), such as $MAPbI_3$, Formamidinium (FA) compounds, mixed cations and mixed halides ($MA_xFA_{1-x}PbI_yBr_{3-y}$), ($Cs_aMA_bFA_{1-a-b}PbI_{3-x-y}Br_x$-$Cl_y$), Tin (II) based mixed cations and mixed halides ($Cs_a$-$MA_bFA_{1-a-b}SnI_{3-x-y}Br_xCl_y$), double perovskite ($A_aM1_bM2_cX_d$), polythiophenes, such as $P_3HT$, Nickel oxyhydroxides ($NiO_x$), titanium oxide, tin oxide and/or carbon. In some embodiments, one or more substances may be used to form a film and/or coating on top of another film or coating of one or more of the substances. For example, in some cases it may be possible that a $P_3HT$ film is be formed above a $MAPbI_3$ layer. In some embodiments, the liquid precursor may be a solution of $FA0.4MA0.6PbI_3$. For example, $GACl_3$ may be added as a dopant in a perovskite precursor (such as $MAPbI_3$). In some cases, a $P_3HT$ or $NiO_x$ layer may be spin-coated on one or more perovskite films.

The solution 14 may have a range of viscosities, surface energies, and/or optical and electrical properties. In various embodiments, the concentration, volume, and soaking time of solution 14 may be carefully controlled to form films with different thickness. In various embodiments, the volatility, viscosity and/or surface energy of the solution 14 may influence the uniformity and smoothness of as-formed films.

As shown in FIG. 1B, the second substrate 10A may be positioned above the first surface 10A, parallel thereto, and spaced apart therefrom. The first surface 12A and second surface 12B may be substantially planar, opposed to each other, and parallel to each other.

In some embodiments, the first substrate 10A and the second substrate 10B may be moved toward each other as indicated by the double-headed arrows in FIG. 1B, perpendicular to the first surface 12A and the second surface 12B.

Advantageously, in some embodiments, the first substrate 10A and the second substrate 10B may approach each other parallel to each other to squeeze the solution 14 at a defined gap. In some embodiments, the first substrate 10A and the second substrate 10B contact each other at an angle between 0 to 90 degree and then become parallel with each other to squeeze the solution 14 at a defined gap.

As shown in FIG. 1C, the second substrate 10B is spaced apart from the first substrate 10B to define a gap 8 between the first surface 12A and the second surface 12B.

Displacing the second surface 12A towards the first surface 12B in such a manner may squeeze the solution 14 within the gap 8 to fill the gap 8.

Such spacing apart may cause the second surface 12B to contact the solution 14 on the first surface 12A. In some embodiments, this may cause the solution 14 to spread over the first surface 12A and the second surface 12B. Such spreading may establish planar contact of the solution 14 with the first surface 12A and the second surface 12B. Planar contact with a plane may refer to complete contact with the plane.

In some embodiments, spreading of the solution 14 on the first substrate 10A and second substrate 10B may be substantially uniform across the first surface 12A and the second surface 12B. The planar nature of the first surface 12A and the second surface 12B and parallel arrangement with respect to each other may enable uniform spreading and/or a final uniform configuration of the solution 14 sandwiched between the first surface 12A and the second surface 12B. For example, in some cases, the spreading may be non-uniform but the final state of the solution 14 may be uniform. In some embodiments, such uniformity may be achieved after a duration of time associated with a response time of the solution 14 to external forcing.

As shown in FIGS. 1D-1E, the second substrate 10B may be slid over the first substrate 10A in a direction parallel to the first surface 12A and the second surface 12B (see double-headed arrows in FIG. 1D). At the same time, the second surface 12A and the second surface 12B may be maintained parallel to each other, in contact with the solution 14, and perpendicularly spaced apart by a distance defined by the gap 8. This draws the solution 14 across the surfaces 12A, 12B. When the substrates 10A, 10B slide past one another, each surface 12A, 12B is left with a coating 16A, 16B. In this embodiment, the first substrate 10A is static.

In an alternative embodiment, the first substrate 10A may be slid over the second substrate 10B in a direction parallel to the second surface 12B and the first surface 12A. At the same time, the second surface 12A and the first surface 12B may be maintained parallel to each other, in contact with the solution 14, and perpendicularly spaced apart by a distance defined by the gap 8. This draws the solution 14 across the surfaces 12A, 12B. When the substrates 10A, 10B slide past one another, each surface 12A, 12B is left with a coating 16A, 16B. In this embodiment, the second substrate 10B is static.

In yet another embodiment, both the first substrate 10A and the second substrate 10B move over each other. In other words, both the first substrate 10A and the second substrate 10B move. This draws the solution 14 across the surfaces 12A, 12B. When the substrates 10A, 10B slide past one another, each surface 12A, 12B is left with a coating 16A, 16B.

As a result, the first surface 12A and second surface 12B may be substantially uniformly coated with the solution 14. Simultaneous coating of two substrates achieved by the method provide increased throughput to the manufacturing process.

In various embodiments, the gap 8 may be adapted to a predetermined thickness 24A, 24B of the respective first and second coatings 16A, 16B. In some embodiments, the thickness 24A may be equal to thickness 24B and the gap 8 may be adapted to this thickness. In some of these embodiments, where the thickness 24A is equal to the thickness 24B, the gap 8 may be at least or substantially equal to twice the predetermined thickness 24A, 24B. In some embodiments, the gap 8 may be at least or substantially equal to the sum of the thickness 24A and the thickness 24B.

After the coatings 16A, 16B are formed, gas 20 may be supplied to flow over the coatings 16A, 16B and the surfaces 12A, 12B to dry the coatings 16A, 16B. In some embodiments, the gas may be air. In one embodiment the gas is an inert gas, for example nitrogen gas. In various embodiments, the gas may be at a temperature between 18° C. and 35° C. The gas pressure is between 0.1 MPa~0.5 MPa.

Before or during the flow of gas 20, low temperature heat treatment (between about 20° C. and 35° C.) may be used on the coatings or the substrates to help with coverage.

After the flow of gas 20 over the coatings 16A, 16B, the coatings 16A, 16B may be heated by application of heat 22 to the coatings 16A, 16B thereto at a temperature between 20° C. and 500° C. for between ten hours and less than 1 minute. A particularly advantageous temperature and time to achieve better quality perovskite films may be about 100° C., or between 100° C. and 150° C. for between 10 and 30 minutes. For example, the heat may be applied by placement of the coated first substrate 10A and the second substrate 10B in a hot gaseous environment, for example but not limited to in an oven having hot air, that is at a temperature of about 100° C., or between 100° C. and 150° C. Alternatively, the coated substrates 10A, 10B may be heated using infrared light or high intensity visible light.

As shown in FIG. 1F, the coatings 16A, 16B may form respective films 18A, 18B. For example, such films 18A, 18B may be formed after drying, heating, and/or cooling. In some embodiments, the films 18A, 18B may have perovskite structure.

The gap 8, and/or coatings 16A, 16B, may be adapted to achieve a respective predetermined thickness 26A, 26B of the films 18A, 18B.

The first substrate 10A and second substrate 10B having formed thereon, respectively, the first film 18A and second film 18B, may form, respectively, a first photovoltaic device 19A and a second photovoltaic device 19B.

In various embodiments, drawing a surface or substrate over another surface or substrate may refer to relative drawing between the two surfaces and substrates. For example, the first substrate 10A or the second substrate 10B may be held stationary during parallel drawing.

In various embodiments, the thickness 24A and the thickness 26A may be different than, respectively, the thickness 24B and the thickness 26B.

In various embodiments, the substrates 10A, 10B may translate (or be slid) at varying, the same, or distinct speeds. Varying material thickness 26A, 26B, may achieved by controlling the speed of each of the substrates 10A, 10B.

In various embodiments, uniformity and smoothness of the films may be affected by varying the speed of each of the substrates 10A, 10B. In some cases, advantageously, it is found that high-quality films may be obtained at high speeds.

In various embodiments, the substrates 10A, 10B may have similar or different surface treatments, including but not limited to surface UV-ozone treatment, surface solvent treatment, and surface preheat treatment. If the substrate 10A has a different surface treatment than the substrate 10B, then the resulting films 18A, 18B may have different corresponding thickness, uniformity and surface properties. Variation in such properties may result in varying physical and optical properties.

In one embodiment, the substrates 10A and 10B may be pre-heated. Pre-heating can be any temperature between 25° C. to 200° C., including 60° C.

FIG. 2 is a flow chart of a method 200 of forming a coating of a substance, in accordance with an embodiment.

Step 202 of the method 200 may include disposing the solution on a first surface, the first surface being planar.

Step 204 of the method 200 may include causing a second surface to be positioned above the first surface to contact the solution on the first surface, the second surface being planar, parallel to the first surface, and spaced apart from the first surface.

Some embodiments of the method 200 may include a step of after positioning the second surface above the first surface to contact the second surface with the solution on the first surface, displacing the second surface towards the first surface to spread the solution over the first surface to fill a gap between the first surface and the second surface.

Step 206 of the method 200 may include causing the second surface to be slid over the first surface and parallel to the first surface while the second surface is in contact with the solution on the first surface to coat the solution over the first surface.

In an alternative embodiment of the method, the second surface remains static and the first surface is slid over the second surface. In yet another embodiment of the method, the two surfaces are slid over one another.

In some embodiments of the method 200, the gap may be adapted to a predetermined thickness of the coating.

In some embodiments of the method 200, the gap may be at least twice a predetermined thickness of the coating.

In some embodiments of the method 200, a second coating on the second surface may be formed by step 204.

Some embodiments of the method 200 may include a step of causing gas to flow over the coating to dry the coating. In some embodiments, the method 200 may include a step of causing exposure of the coating to light and/or heat to dry the coating.

In some embodiments of the method 200, the first surface may be a surface of a first plate, and the second surface may be a surface of second plate.

Some embodiments of the method 200 may include a step of heating the first plate to heat the coating on the first surface. In some embodiments of the method 200, such a step may include applying heat to a surface of the first plate opposed the first surface. In some embodiments of the method 200, the surface may be a surface of the first plate separate from the first surface and facing opposite the first surface, and applying heat to the surface of the first plate opposed the first surface may include applying heat uniformly across the surface. In some embodiments of the method 200, such a step may include other methods of applying heat, as described previously.

FIG. 3 is a flow chart of a method 300 of manufacturing a thin-film photovoltaic cell.

Step 302 of the method 300 may include applying a liquid precursor on a first surface of a first substrate, the first surface being planar.

In some embodiments of the method 300, the second substrate may be spaced apart from the first substrate to define a gap between the second surface and the first surface. Some embodiments of the method 300 may include a step of after applying the liquid precursor on the first surface, displacing the second surface towards the first surface to squeeze the liquid precursor within the gap to fill the gap, such that the liquid precursor is spread over the first surface and the second surface to establish planar contact of the liquid precursor with the second surface.

Step 304 of the method 300 may include causing a second surface of a second substrate to be slid over the first surface and parallel to the first surface while the second surface is parallel to the first surface and in planar contact with the liquid precursor, such that the first surface and second surface are coated with the liquid precursor once they slide passed one another, the second surface being planar and spaced apart from the first substrate.

Step 306 of the method 300 may include drying the liquid precursor on the first surface and the second surface to form a first film on the first substrate and a second film on the second substrate.

In some embodiments of the method 300, the first film and the second film may be perovskite films.

In an alternative embodiment of the method, the second surface remains static and the first surface is slid over the second surface. In yet another embodiment of the method, the two surfaces are slid over one another.

In some embodiments of the method 300, the step 304 may include causing the first surface and second surface to be substantially uniformly coated with the liquid precursor.

In some embodiments of the method 300, the step 304 may include preventing portions of the second substrate that are non-parallel to the first surface from contacting the liquid precursor.

In some embodiments of the method 300, the first surface includes a first plate and the second surface includes a second plate.

In some embodiments of the method 300, the step 306 may include causing gas to flow over the liquid precursor on the first surface and the second surface.

In some embodiments of the method 300, the step 306 may include exposing the first surface and the second surface to light for drying.

In some embodiments of the method 300, the step 306 may include applying heat to the first substrate and the second substrate, including advantageously applying heat.

Some embodiments of the method 300 may include heating the first film and the second film at about 100° C.

Some embodiments of the method 300 may include heating the first film and the second film at between 300° C. and 50° C. for between 10 hours and one minute or 30 minutes and a 1 minute.

Figures 4A, 4B:
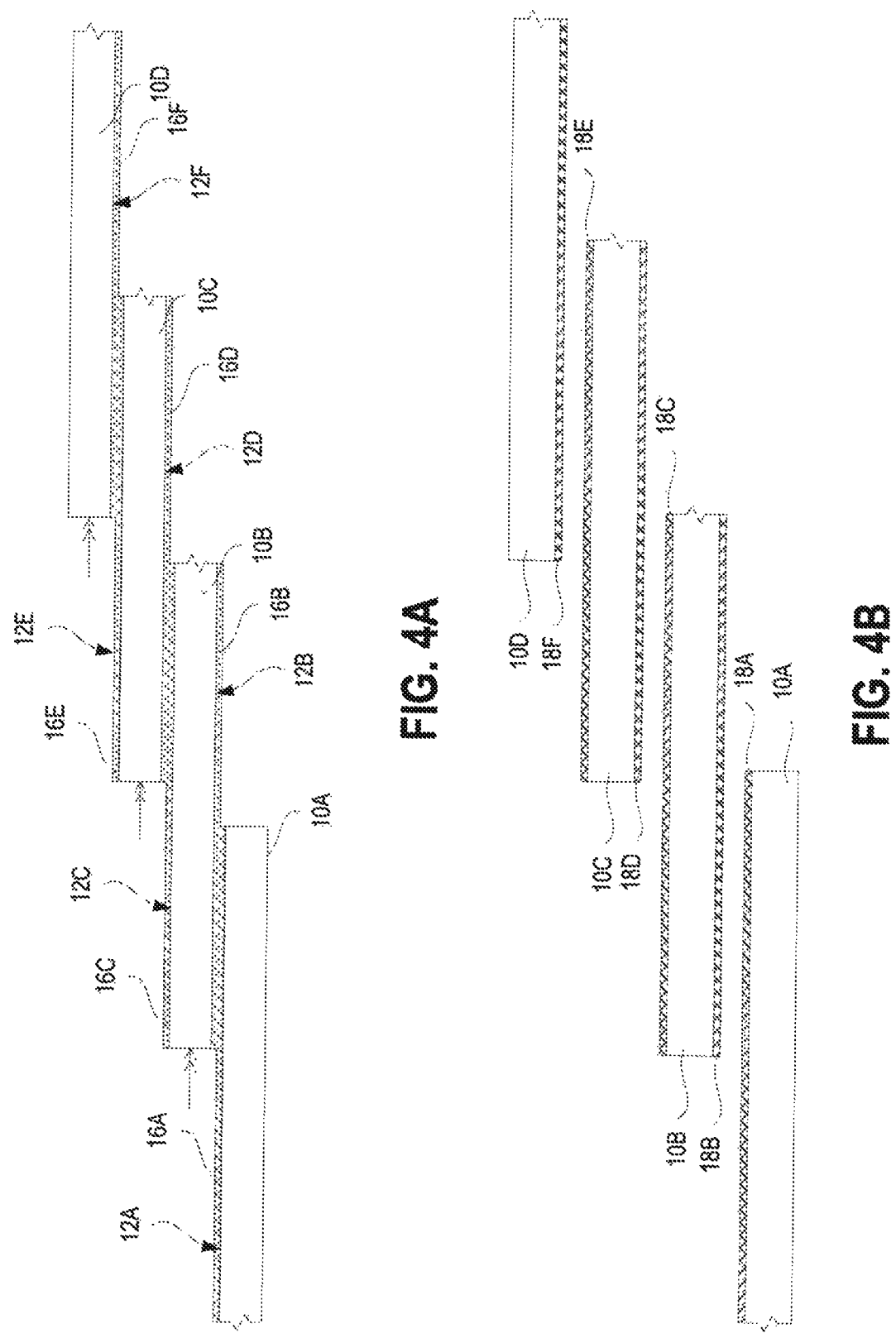
FIG. 4A is a side elevation view of a plurality of substrates being slid parallel to each other to form coatings on each of the plurality of substrates, in accordance with an embodiment.
FIG. 4B is a side elevation view of the plurality of substrates after formation of respective films thereon, in accordance with an embodiment.

FIG. 4A is a side elevation view of a plurality of substrates 10A-1D being slid parallel to each other to form, once they slide passed each other, coatings 16A-16F on each of the substrates 10A-11D, in accordance with an embodiment.

FIG. 4B is a side elevation view of the plurality of substrates 10A-10D after formation of respective films 18A-18F thereon, in accordance with an embodiment.

The substrates 10A, 10D may have corresponding coatings 16A, 16F on their surfaces 12A, 12F. The substrates 10B, 10C may have each have two coatings. The substrate 10B may have coatings 16B, 16C formed on opposing surfaces 12B, 12C of the substrate 10B. The substrate 10C may have coatings 16D, 16E formed on opposing surfaces 12D, 12E of the substrate 10C. The coatings may be the same or different, for example, coating 16A and 16B may differ from coating 16C and 16D.

As shown in FIG. 4A, each of the plurality of substrates 10A-10D may be translate in the same direction (indicated by the double-headed arrows). The translation may occur at varying speeds to achieve formation of the coatings.

In an alternative embodiment, there may be static substrates and the adjacent substrate is slid over the static substrate, for example, substrate 10B may be static and substrates 10A and 10C may move over substrate 10B. Similarly, substrate 10C may be static and substrates 10B and 10D move over substrate 10C. Finally, substrate 10D may be static and substrate 10C moves over substrate 10D. Substrate 10A and 10C may be static and substrate 10B and 10D may move over substrate 10A and 10C respectively. As would be known to one skilled in the art, further combinations of static and moving substrates may be contemplated, as long as there is movement of one substrate over the adjacent substrate.

Heat and/or gas may be applied to each of the plurality of substrates 10A-1D to form the films 18A, 18B, 18C, 18D, 18E, 18F.

Figures 5A, 5B:
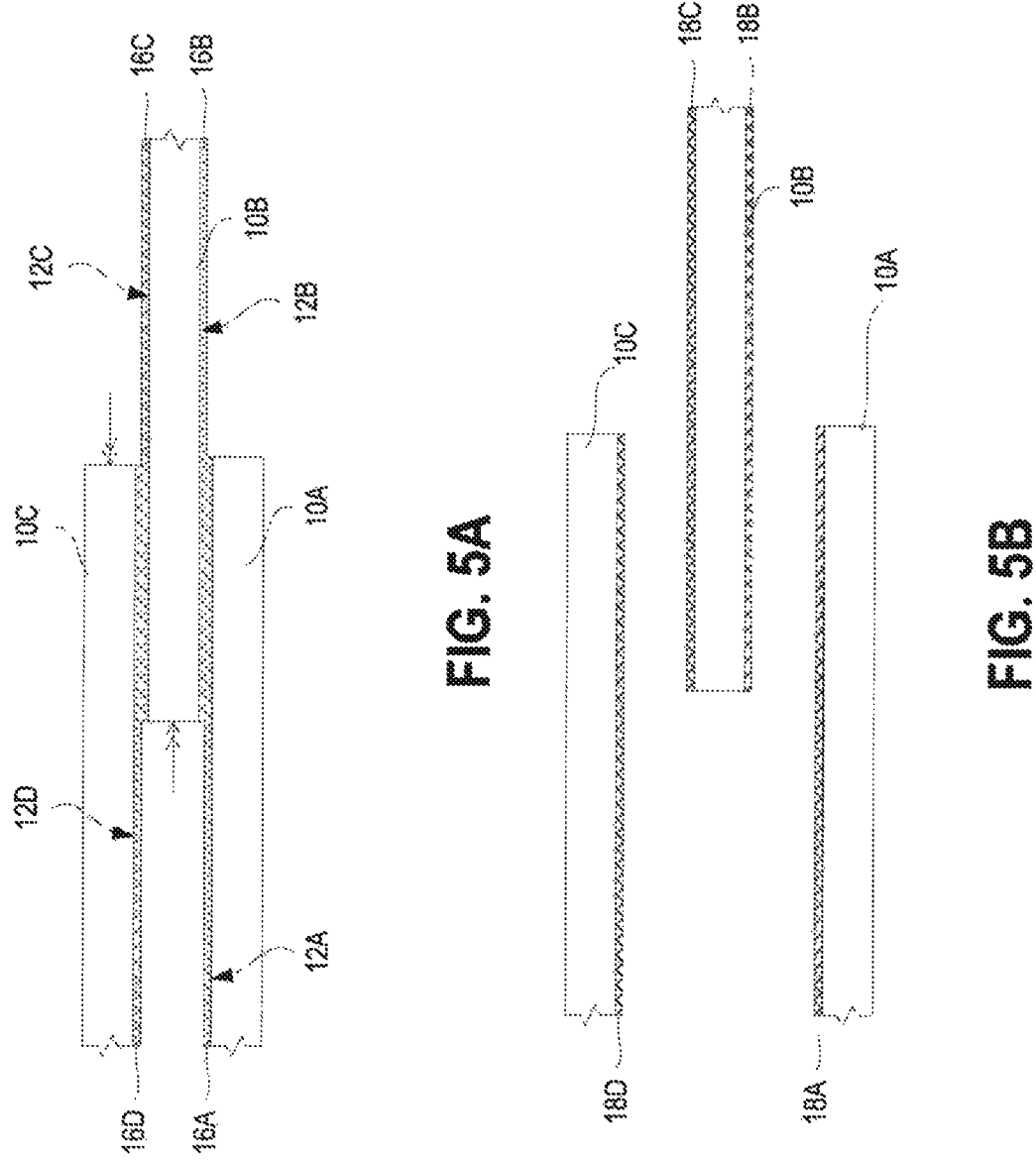
FIG. 5A is a side elevation view of a plurality of substrates being slid parallel to each other to form coatings on each of the plurality of substrates, in accordance with another embodiment.
FIG. 5B is a side elevation view of the plurality of substrates after formation of respective films thereon, in accordance with another embodiment.

FIG. 5A is a side elevation view of a plurality of substrates 10A-10C being slid parallel to each other to form, once the substrates have slid passed one another, coatings 16A-16D on each of the plurality of substrates 10A-10C, in accordance with another embodiment.

As shown in FIG. 5A, the substrate 10B may be slid relative to the substrates 10A, 10C to achieve formation of coatings, once the substrates have slid passed one another. The translation may occur at varying speeds to achieve formation of the coatings.

FIG. 5B is a side elevation view of the plurality of substrates 10A-10C after formation of respective films 18A-18D thereon, in accordance with another embodiment.

The substrates 10A, 10C may have corresponding coatings 16A, 16D on their surfaces 12A, 12D. The substrates 10B, 10C may have each have two coatings. The substrate 10B may have coatings 16B, 16C formed on opposed surfaces 12B, 12C of the substrate 10B.

Heat and/or gas may be applied to each of the plurality of substrates 10A-10C to form the films 18A, 18B, 18C, 18D.

The embodiments described in this document provide non-limiting examples of possible implementations of the present technology. Upon review of the present disclosure, a person of ordinary skill in the art will recognize that changes may be made to the embodiments described herein without departing from the scope of the present technology. Modifications could be implemented by a person of ordinary skill in the art in view of the present disclosure, which modifications would be within the scope of the present technology.

The invention claimed is:

1. A method of concomitantly manufacturing at least two thin-film devices, the method comprising:

applying a solution on a first surface of a first planar substrate;

positioning a second surface of a second planar substrate proximate to the first surface of the first planar substrate to provide parallelly disposed adjacent substrates, such that the first surface and the second surface are in contact with the solution;

sliding the parallelly disposed adjacent substrates over one another such that the solution is drawn over the first surface and the second surface, which when the parallelly disposed adjacent substrates slide passed one another, provide a first coating on a first surface and a second coating on the second surface; and drying the first coating and the second coating, thereby concomitantly manufacturing at least two thin-film devices.

2. The method of claim 1, wherein the second substrate is spaced apart from the first substrate to define a gap between the second surface and the first surface, the method further comprising:

after positioning the second surface of the second planar substrate proximate to the first surface, displacing the second surface towards the first surface to urge the liquid within the gap to fill the gap, such that the solution is spread over the first surface and the second surface to establish planar contact of the solution with the first surface and the second surface.

3. The method of claim 2, further comprising heating the substrate prior to applying the solution.

4. The method of claim 2, further comprising heating at least one of the at least two thin-film devices after drying the first coating and the second coating.

5. The method of claim 4, wherein the second surface of the second substrate is slid over the first surface of the first substrate, which is static.

6. The method of claim 4, wherein the first surface of the first substrate is slid over the second surface of the second substrate, which is static.

7. The method of claim 4, wherein both the first surface of the first substrate and the second surface of the second substrate are slid over one another.

8. The method of claim 4, wherein the heating is at between 50° C. and 300° C.

9. The method of claim 8, wherein the heating is at 100° C.

10. The method of claim 9, wherein the solution is a liquid precursor.

11. The method of claim 10, wherein the liquid precursor is a perovskite precursor.

12. The method of claim 11, further comprising applying a second solution to the first coating after drying the first coating and the second coating, positioning the second surface of the second planar substrate proximate to the first surface of the first planar substrate to provide parallelly disposed adjacent substrates, such that the first coating and the second coating are in contact with the second solution;

sliding the parallelly disposed adjacent substrates over one another such that the solution is drawn over the first coating and the second coating, which when the parallelly disposed adjacent substrates slide passed one another, provide a third coating on a first coating and a fourth coating on the second coating; and drying the third coating and the fourth coating, thereby manufacturing at least two thin-film perovskite devices.

13. The method of claim 4, further comprising applying a second solution to the first coating after drying the first coating and the second coating, positioning the second surface of the second planar substrate proximate to the first surface of the first planar substrate to provide parallelly disposed adjacent substrates, such that the first coating and the second coating are in contact with the second solution;

sliding the parallelly disposed adjacent substrates over one another such that the solution is drawn over the first coating and the second coating, which when the parallelly disposed adjacent substrates slide passed one another, provide a third coating on a first coating and a fourth coating on the second coating; and drying the third coating and the fourth coating, thereby manufacturing at least two thin-film devices.

14. The method of claim 13, further comprising applying at least one additional solution after drying the third coating and the fourth coating, and repeating the positioning, sliding and drying steps.

15. The method of claim 4, further comprising applying the solution or a different solution on a first surface of the second planar substrate;

positioning a second surface of a third planar substrate proximate to the first surface of the second planar substrate to provide parallelly disposed adjacent substrates, such that the first surface of the second planar substrate and the second surface of the third planar substrate are in contact with the solution or the other solution;

sliding the parallelly disposed adjacent substrates over one another such that the solution or the different solution is drawn over the first surface of the second planar substrate and the second surface of the third planar substrate, which when the parallelly disposed adjacent substrates slide passed one another, provide a first coating on the first surface of the second planar substrate and a second coating on the second surface of the third planar substrate; and drying the first coating on the first surface of the second planar substrate and the second coating on the third planar substrate.

16. The method of claim 4, further comprising layering a temporary substrate on the first surface of the first substrate and the second surface of the second substrate.

17. A method of concomitantly manufacturing at least two thin-film photovoltaic devices, the method comprising:

applying a liquid perovskite precursor on a first surface of a first planar substrate;

positioning a second surface of a second planar substrate proximate to the first surface of the first planar substrate to provide parallelly disposed adjacent substrates, such that the first surface and the second surface are in contact with the liquid perovskite precursor;

sliding the parallelly disposed adjacent substrates over one another such that the liquid perovskite precursor is drawn over the first surface and the second surface, which when the parallelly disposed adjacent substrates slide passed one another, provide a first coating on a first surface and a second coating on the second surface;

drying the first coating and the second coating to provide a first film and a second film; and fabricating a charge transport layer on each of the first film and the second film;

fabricating an electrode on the charge transport layers, thereby concomitantly manufacturing at least two thin-film photovoltaic devices.

18. The method of claim 17, wherein the liquid perovskite precursor is organic-inorganic halide perovskite precursor.

* * * * *